US 6,697,438 B2

(12) United States Patent
Doetsch et al.

(10) Patent No.: US 6,697,438 B2
(45) Date of Patent: Feb. 24, 2004

(54) CIRCUIT CONFIGURATION FOR A MULTISTANDARD COMMUNICATIONS TERMINAL

(75) Inventors: Markus Doetsch, Schliern (CH); Peter Jung, Otterberg (DE); Jörg Plechinger, München (DE); Peter Schmidt, Erpolzheim (DE); Sönke Mehrgardt, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 380 days.

(21) Appl. No.: 09/897,283

(22) Filed: Jul. 2, 2001

(65) Prior Publication Data

US 2002/0003844 A1 Jan. 10, 2002

Related U.S. Application Data

(63) Continuation of application No. PCT/DE99/04127, filed on Dec. 30, 1999.

(30) Foreign Application Priority Data

Dec. 30, 1998 (DE) .......................... 198 60 816

(51) Int. Cl.[7] .......................... H03K 9/00; H04L 27/06; H04L 27/14; H04L 27/22
(52) U.S. Cl. .................... 375/316; 375/350; 455/168.1; 455/552
(58) Field of Search ................................ 375/316, 340, 375/346, 348, 350, 285; 455/168.1, 161.1, 552, 553, 130, 307, 339, 340; 708/300

(56) References Cited

U.S. PATENT DOCUMENTS

| 4,368,434 | A | | 1/1983 | Miller et al. |
| 5,473,280 | A | | 12/1995 | Ohnishi et al. |
| 5,555,453 | A | | 9/1996 | Kajimoto et al. |
| 5,557,642 | A | | 9/1996 | Williams |
| 5,610,948 | A | | 3/1997 | Ninomiya et al. |
| 5,619,536 | A | | 4/1997 | Gourgue |
| 5,712,628 | A | | 1/1998 | Phillips et al. |
| 6,332,083 | B1 | * | 12/2001 | Shi et al. .................. 455/552.1 |

FOREIGN PATENT DOCUMENTS

| DE | 39 18 866 A1 | 12/1990 |
| EP | 0 663 118 B1 | 7/1995 |
| EP | 0 774 850 A2 | 5/1997 |
| EP | 0 793 876 B1 | 9/1997 |
| WO | WO 87/01531 | 3/1987 |
| WO | WO 95/10889 | 4/1995 |

* cited by examiner

*Primary Examiner*—Jean B. Corrielus
(74) *Attorney, Agent, or Firm*—Laurence A. Greenberg; Werner H. Stemer; Ralph E. Locher

(57) ABSTRACT

A circuit configuration for a multistandard communications terminal has, for the reception of radio signals, a radio frequency component with a receive conversion stage and a signal-processing circuit connected downstream of the radio frequency component. The signal-processing circuit has an A/D converter and a digital filter. The pass-band of the digital filter is variable. In operation, the pass-band is set according to a selected system standard of the received radio signals.

12 Claims, 3 Drawing Sheets

CIRCUIT CONFIGURATION FOR A MULTISTANDARD COMMUNICATIONS TERMINAL

CROSS-REFERENCE TO RELATED APPLICATION

This application is a continuation of copending International Application No. PCT/DE99/04127, filed Dec. 30, 1999, which designated the United States.

BACKGROUND OF THE INVENTION

Field of the Invention

The invention relates to a circuit configuration for a multistandard communications terminal that includes a radio frequency component for receiving RF-input signals of different system standards. The radio-frequency component includes a conversion stage for down-converting a received RF-input signal into a received analog signal. The multistandard communications terminal has a digital-signal processing circuit for converting the analog signal into a digital signal. The digital-signal processing circuit has a digital filter that receives the digital signal and therefrom outputs a band-limited digital output signal. The digital filter has a pass-band that is adjustable.

In current conventional communications systems, particularly in those which implement wireless communication, analog signals of a predefined bandwidth B are received. This bandwidth B is system-specific. For example, the bandwidth B of signals in the Global System for Mobile Communications (GSM) is 200 kHz and the bandwidth in the CDMA (Code Division Multiple Access) system IS-95 is 1.25 MHz.

Multistandard terminals (also referred to as multiband devices), which support a plurality of system standards, for example both GSM and IS-95, are already known. These devices use a dedicated standard-specific analog-digital (A/D) converter for each system standard, to which a correspondingly optimized, similarly standard-specific selection filter is connected in the digital domain. The A/D converters separately digitize signals with a bandwidth B' which is greater than the bandwidth B. The selection filters perform the bandwidth limitation to the respectively required standard-specific bandwidth B and decimate the sampling rate (sampling reduction). Each combination of an A/D converter and a selection filter is predefined.

In these known communications terminals, it is disadvantageous that the use of standard-specific A/D transformers and corresponding standard-specific selection filters represents a relatively substantial hardware outlay. A further disadvantage of these devices is that the subsequent incorporation of further system standards can normally be implemented only by means of hardware modifications.

U.S. Pat. Nos. 5,619,536 and 5,557,642 in each case describe receiver circuits for mobile radio communications which have a radio-frequency component, a receiver conversion stage, a signal-processing circuit, an A/D converter, a selection unit and a digital filter. The digital filter has a variable bandwidth which can be set according to the system standard which is used.

International Publication WO 87 01531 A discloses a digital radio-frequency receiver in which, inter alia, different configurations and combinations of digital filters are described.

SUMMARY OF THE INVENTION

It is accordingly an object of the invention to provide a circuit configuration for a multistandard communications terminal which overcomes the above-mentioned disadvantageous of the prior art apparatus and methods of this general type. In particular, it is an object of the invention to provide a circuit configuration for a multistandard communications terminal that can be implemented with little hardware outlay and that offers high flexibility in terms of the system standards which can be received with the multistandard communications terminal.

With the foregoing and other objects in view there is provided, in accordance with the invention a circuit configuration for a multistandard communications terminal, in which the circuit configuration includes a radio frequency component for receiving RF input signals of different system standards and a signal processing circuit. The radio frequency component includes a receiver conversion stage for converting an RF receive signal into an analog receive signal through down-conversion using a predefined conversion frequency. The RF receive signal is formed from at least one of the received RF input signals. The signal-processing circuit includes an A/D converter for converting the analog receive signal into a digital receive signal. The signal-processing circuit includes a selection unit having a digital filter that receives the digital receive signal and outputs a bandwidth-limited digital output signal. The digital filter has a variably adjustable pass-band in which the pass-band is set according to a required one of the different system standards. The digital filter includes a programmable read-only memory storing a table that allocates a set of filter coefficients to each one of the different system standards.

Due to the variability of the pass-band of the digital filter, a standard-specific band limitation can be performed therewith, the same digital filter being used for the bandwidth limitation of all received system standards. The hardware outlay is thus reduced, since it is no longer necessary to provide a digital filter which is separately designed for each system standard.

In addition, the incorporation of subsequently emerging system standards is also enabled by means of a suitable programming functionality of the filter. The flexibility and functional range of the multistandard communications terminal is thereby further increased.

A required system standard can, on the one hand, be defined automatically in that the circuit configuration recognizes a received system standard by evaluating the corresponding RF input signals, in particular radio signals, and by subsequently setting the pass-band of the digital filter according to the recognized system standard. In the case of locally changing system standards, it is then always ensured that the multistandard communications terminal is set to the local system standard. On the other hand, it is also possible for the selection of the system standard to be made by the subscriber himself. This enables the subscriber to select specifically between different standards, for example GSM and IS-95, insofar as radio signals of a plurality of system standards are present. Since different system standards are also normally based on different networks and different network operators, the subscriber is thus also able to choose between the different user facilities of the networks and service offerings and services of the network operators.

The term "system standard" used here is to be understood in a broad sense. Different system standards according to the definition used here occur (at least) whenever the systems use RF input signals (radio signals) of different bandwidths.

The analog received signal generated through downconversion may involve both a baseband signal and a signal in an intermediate frequency range (for example 300 MHz in GSM). In other words, the invention includes not only circuit configurations for "direct conversion receivers" operating according to the homodyne principle but also circuit configurations for heterodyne receivers.

In accordance with an added feature of the invention, the selection unit furthermore preferably includes a sampling rate reduction circuit with a variable sampling rate reduction. The sampling rate reduction that is set in operation is determined by the required system standard. In addition to the standard-specific band limitation, a standard-specific reduction of the sampling rate is also effected by this measure. The sampling rate present at the output of the selection unit can thereby be set in such a way that it meets the different requirements of the individual system standards in terms of symbol rate and signal dynamic range.

The digital filter can be structurally implemented in different ways.

In accordance with an additional feature of the invention, in a first embodiment, the digital filter is designed in the form of an integrated circuit with a coefficient input for setting filter coefficients. The filter is then (system-standard-specifically) configured by entering filter coefficients allocated to a specific system standard. The integrated circuit may contain a shift register connected to the coefficient input to store the filter coefficients.

In accordance with another feature of the invention, in a second embodiment, the digital filter includes a programmable read-only memory (EEPROM), in which a table is stored that allocates a set of filter coefficients to each system standard. In this case, the required filter coefficients are already contained in the digital filter chip and only the required coefficient set must be retrieved by means of an externally performed selection. In this variant, it is advantageous that the digital filter can be adapted to new system standards by re-programming the read-only memory (i.e. by storing new coefficient sets).

In accordance with a further feature of the invention, in order to carry out the calculation operation representing the filtering, the filter may include hard-wired digital circuits such as an adder, a multiplier, a shift register and the like. The actual circuit design defines the filter type (for example, serial, parallel, FIR, IIR). In a different option, the digital filter is designed as a programmable signal processor. In this case, the filter type used is initially variable, and is only defined by the signal processor programming.

In accordance with a further added feature of the invention, both FIR (Finite Impulse Response) and IIR (Infinite Impulse Response) digital filters can be used. Whereas IIR filters have a higher selectivity and a lower calculation requirement than FIR filters, the latter have the advantage, inter alia, that, independently of the coefficient selection, they always have a very low tendency towards oscillation, i.e. they have equally good stability characteristics for all system standards.

In accordance with a further additional feature of the invention, a favorable implementation of the digital filter from the point of view of minimum calculation outlay is provided. This implementation is characterized in that the digital filter includes a plurality of individual filters, the sampling rate reduction circuit includes a plurality of individual sampling rate reduction circuits, and the individual filters and the individual sampling rate reduction circuits are configured alternately in series.

In accordance with yet an added feature of the invention, in order to increase conversion accuracy, a delta-sigma (ΔΣ) A/D converter, particularly a third-order converter, is preferably used. Substantial quantization error reduction and therefore an improvement in the signal-to-noise ratio at the output of the selection unit can thereby be achieved.

In accordance with yet an additional feature of the invention, the delta-sigma A/D converter is operated at a sampling rate according to the selected one of the different system standards.

In accordance with a concomitant feature of the invention, the digital filter preferably has an order between 5 and 20, and even more preferably, the digital filter has an order between 10 and 18.

Other features which are considered as characteristic for the invention are set forth in the appended claims.

Although the invention is illustrated and described herein as embodied in a circuit configuration for a multistandard communications terminal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
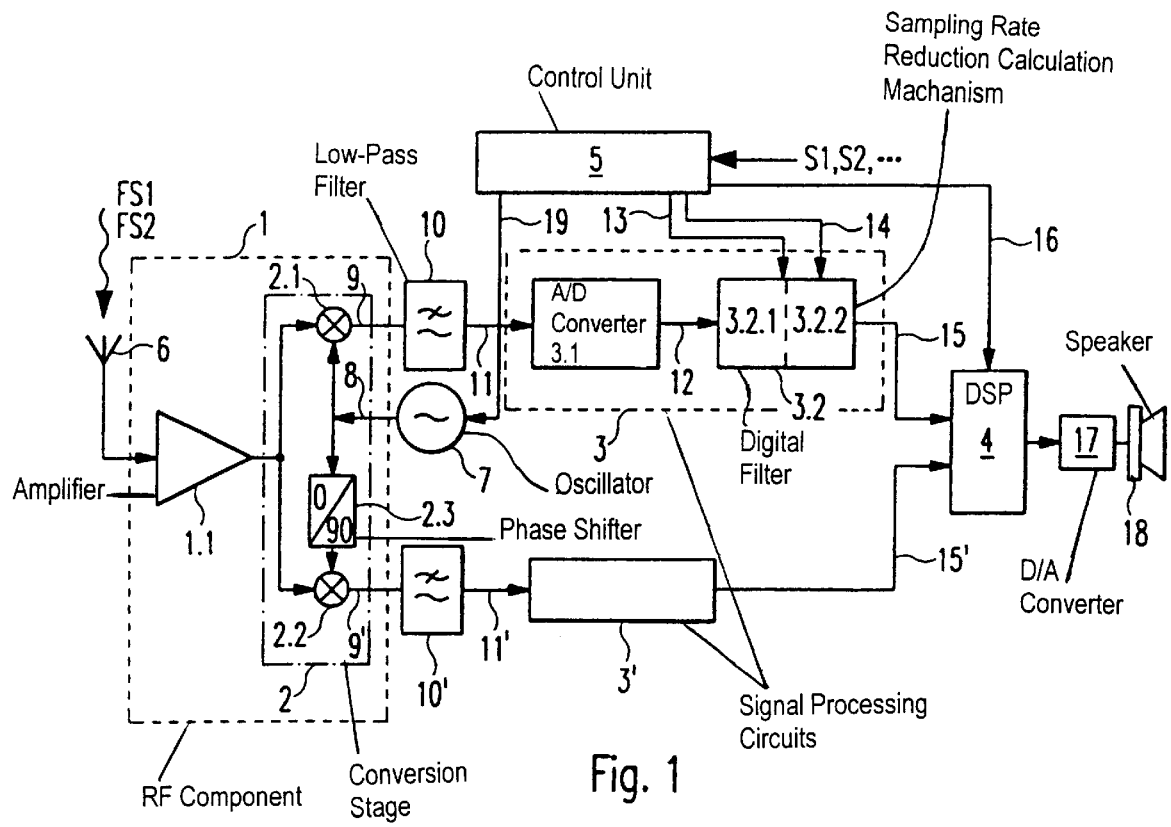
FIG. 1 shows a block diagram of a circuit configuration according to the invention for a homodyne receiver.

Referring now to the figures of the drawing in detail and first, particularly, to FIG. 1 thereof, there is shown an inventive circuit configuration that can be used in a communications terminal, for example a mobile station of a mobile radio system.

A radio-frequency component 1 of the circuit configuration includes an amplifier with automatic gain control 1.1. The signal input of the amplifier is connected to a receive antenna 6.

The receive antenna 6 receives radio signals FS1 and FS2, which are transmitted from a base station (not shown). The two radio signals FS1 and FS2 are based on different mobile radio standards S1 and S2. Examples of different mobile radio standards are the US-American standard AMPS (Advanced Mobile Phone Service) and IS-95 (Interim Standard 95) or the pan-European standard GSM or its variant DCS 1800 (Digital Cellular System 1800). The different system standards S1 and S2 are presently intended to be involved if S1 and S2 have different bandwidths BS1 and BS2. However, system standards S1, S2 normally differ from one another in terms of a multiplicity of further parameters which relate, for example, to the carrier frequency, multiple access type, bit rate, modulation type, source and channel coding, etc.

The radio signals FS1 and FS2 are amplified in the amplifier 1.1. At its output, the amplifier 1.1 supplies an analog RF receive signal which corresponds to the superimposed received radio signals (FS1, FS2). The RF receive signal is fed to the inputs of two parallel-connected first and second downconverters 2.1 and 2.2.

The conversion frequency $f_M$ for both downconverters 2.1 and 2.2 is provided by a conversion frequency signal 8 of a local oscillator 7. While the conversion frequency signal 8 is fed directly to the first downconverter 2.1, it passes through a 90° phase shifter 2.3 prior to input into the second downconverter 2.2. The downconverted analog receive signal 9 output by the first downconverter 2.1 is normally designated as the inphase (I) receive signal, and the phase-shifted analog receive signal 9' output by the second downconverter 2.2 is referred to as the quadrature (Q) receive signal.

The two downconverters 2.1 and 2.2 and the 90° phase shifter 2.3 form the receive conversion stage 2 shown by the dotted and dashed line in FIG. 1.

The further processing of the analog I and Q receive signals 9, 9' is identical. It is therefore explained below only with reference to the analog I receive signal 9. Furthermore, for simpler illustration, only the baseband range is examined, i.e. on the basis of a homodyne receiver. The following description can be transferred by analogy to the case of a heterodyne receiver, by examining an intermediate frequency range instead of the baseband range, and by examining a digital band-pass filter with a variable pass-band instead of the digital low-pass filter with a variable pass-band which is described in detail below.

The analog I receive signal 9 is fed into an analog low-pass filter 10. The low-pass filter 10 performs a first band limitation of the received signal to a bandwidth B'. The bandwidth B' does not relate to a specific system standard and must therefore be greater than the greatest of the bandwidths BS1, BS2 of all received radio signals FS1, FS2.

The analog I receive signal 11 (or analog Q receive signal 11') output by the analog low-pass filter 10 (or, in relation to the Q branch, by the analog low-pass filter 10') is fed to a signal-processing circuit 3 (or 3'). The signal-processing circuit 3 has a $\Delta\Sigma$ A/D converter 3.1 on the input side and a selection unit 3.2 which is connected downstream of the latter.

The $\Delta\Sigma$ A/D converter 3.1 samples the analog I receive signal 11 with a sampling frequency $f_A$. In order to achieve high conversion accuracy, the $\Delta\Sigma$ A/D converter 3.1 operates in up-sampling mode, i.e. $f_A > 2B'$ applies.

The $\Delta\Sigma$ A/D converter 3.1 may be a first-order or higher-order converter. The higher the order, the higher the conversion accuracy—although the calculation outlay also increases as the order rises. A third-order $\Delta\Sigma$ A/D converter 3.1 enables the present invention to be implemented with a good compromise between conversion accuracy and calculation outlay. The design of $\Delta\Sigma$ A/D converters is essentially known and is therefore not explained in detail below.

The digital receive signal 12 output by the $\Delta\Sigma$ A/D converter 3.1 is fed to a digital filter 3.2.1 of the selection unit 3.2. According to the invention, the digital filter 3.2.1 has a variably definable pass-band DB.

Furthermore, the selection unit 3.2 has a sampling rate reduction calculation mechanism 3.2.2. The sampling rate reduction calculation mechanism 3.2.2 performs a reduction of the sampling rate $f_A$ present at the input of the selection unit 3.2 to a sampling rate $f_B$ present at the output of the selection unit 3.2.

A control unit 5 which supplies a bandwidth-setting signal 13 to the filter 3.2.1 is provided in order to set the pass-band DB of the digital (low-pass) filter 3.2.1. Along with the bandwidth-setting signal 13, the control unit 5 may furthermore output a sampling rate reduction setting signal 14, which is fed to the sampling rate reduction calculation mechanism 3.2.2, to which it signals a required output-side sampling rate $f_B$.

A bandwidth-limited digital output signal 15 is available at the output of the selection unit 3.2 (in relation to the I branch). This output signal 15 is fed together with a correspondingly generated bandwidth-limited digital output signal 15' of the Q branch to a digital signal processor (DSP) 4.

The DSP 4 performs the further signal-processing steps in a conventional manner. The DSP 4 may include a channel estimator, a data detector, a deinterleaver, a channel decoder and a source decoder for this purpose.

The channel estimator serves to determine the transmission function of the time-variant mobile radio channel at regular time intervals (e.g. every 1 ms). Since this transmission function constantly changes due to changing environmental influences, data detection is not possible without knowledge of the current transmission function.

The data detector then performs the data detection using the current transmission function.

The detected data are then deinterleaved, channel-decoded and source-decoded.

All of the aforementioned data processing operations in the DSP 4 may be standard-specific, i.e. must be carried out according to the selected system standard S1, S2 according to different algorithms. The selected system standard S1, S2 is signaled by the control unit 5 via a signal line 16 to the DSP 4 for this purpose.

A D/A converter 17 and a loudspeaker 18 are connected to the DSP 4.

The mode of operation of the circuit configuration according to the invention is as follows:

The circuit configuration must first be set to one of the received system standards S1, S2. For this purpose, the required system standard S1 or S2 is entered by the subscriber directly into the control unit 5, or it is also possible, in a manner not shown, for the system standard S1 or S2 to be set automatically by the circuit configuration, for example by evaluating the received radio signal(s) FS1 and FS2. In the latter case, the setting may also be performed according to a selection profile previously entered by the subscriber (e.g. selection of the least-cost received system standard).

It will be assumed below that the system standard S1 is the GSM standard, and the system standard S2 is IS-95. In this case, the bandwidth BS1 of S1 is 200 kHz, and the bandwidth BS2 of S2 is 1.25 MHz.

The carrier frequencies of these two standards S1 and S2 likewise differ. In order to enable the conversion stage 2 to downconvert the amplified RF receive signal to the baseband (or to a suitable intermediate frequency), the required conversion frequency $f_M$ must be signaled to the local oscillator 7. This is done via the signal line 19, via which the control unit 5 is connected to the local oscillator 7. If S1 (GSM) is selected, the conversion frequency $f_M$ for direct conversion (homodyne principle) is in the 900 MHz range.

The sampling rate $f_A$ of the ΔΣ A/D converter 3.1 may, for example, be 6.5 MHz.

The digital low-pass filter 3.2.1 performs a bandwidth limitation DB to the system-specific GSM bandwidth BS1=200 kHz or slightly below.

The sampling rate reduction calculation mechanism 3.2.2 reduces the sampling rate to the GSM symbol rate (bit rate) of $F_B=271\times10^3$ samples/s.

However, if the subscriber selects the system standard S2 (IS-95), along with the aforementioned modification of the conversion frequency $f_M$ via the bandwidth-setting signal 13, the pass-band DB of the digital filter 3.2.1 is set to the bandwidth of IS-95 (BS2=1.25 MHz) or slightly below. The sampling rate $f_B$ at the output of the selection unit 3.2 is set via the sampling rate reduction setting signal 14 to $f_B=1.23\times10^6$ samples/s of the IS-95 system standard. The selection unit 3.2 then carries out both the bandwidth limitation and the decimation of the sampling rate according to the system standard S2 (IS-95).

Figure 2:
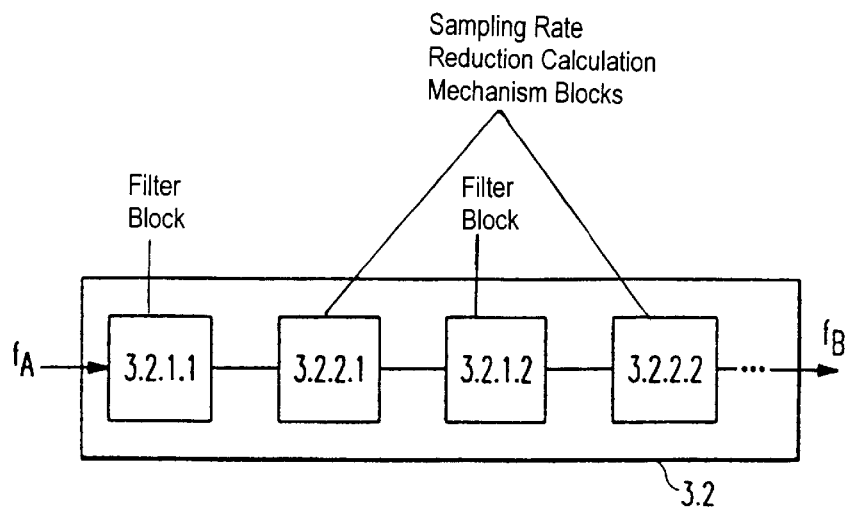
FIG. 2 shows a block diagram of a selection unit.

FIG. 2 schematically shows the structure of a selection unit 3.2, in which filter blocks 3.2.1.1 and 3.2.1.2 and sampling rate reduction calculation mechanism blocks 3.2.2.1 and 3.2.2.2 are configured in an alternating cascading manner. This structure offers the advantage of reduced calculation outlay, since the sampling rate is always adapted to the instantaneously attained bandwidth limitation.

Figure 3:
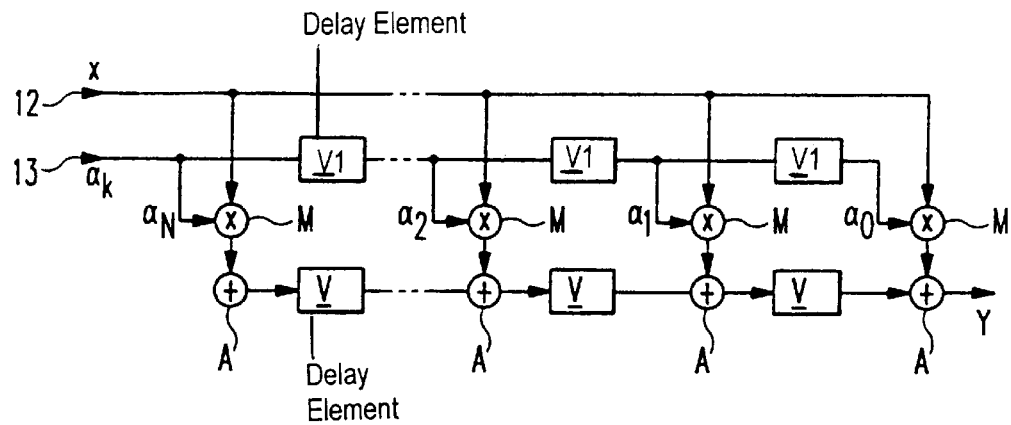
FIG. 3 shows a block diagram of a parallel FIR filter.

The digital filter 3.2.1 may be designed as a commercially available integrated filter component. FIG. 3 shows the structure of an integrated filter component of this type, using the example of a parallel Nth-order FIR filter.

The FIR filter includes adders A, multipliers M and delay elements V. The values x of the digital input signal 12 are fed simultaneously to all multipliers M, where they are multiplied by filter coefficients $\alpha_0, \alpha_1, \alpha_2, \ldots, \alpha_N$. The values y of the digital output signal of the FIR filter are calculated in the manner shown through addition and delay around a system clock.

A filter coefficient set $(\alpha_0, \alpha_1, \ldots \alpha_N)$ defines the pass-band DB of the filter. The control unit 5 contains a table stored in a memory, which allocates a filter coefficient set $(\alpha_0, \alpha_1, \ldots, \alpha_N)$ to each system standard S1, S2. When a specific system standard S1 or S2 is selected, the corresponding filter coefficient set is loaded into the filter via the bandwidth-setting signal 13. The filter includes delay elements V1, which form a shift register in the manner shown, in order to store the coefficients.

The adaptive capability according to the invention of the digital FIR filter shown in FIG. 3 is based on the fact that it can be configured for a different system standard by exchanging the coefficient set.

Due to the parallel processing, the FIR filter shown in FIG. 3 is particularly suitable for high input-side sampling rates $f_A$.

Figure 4:
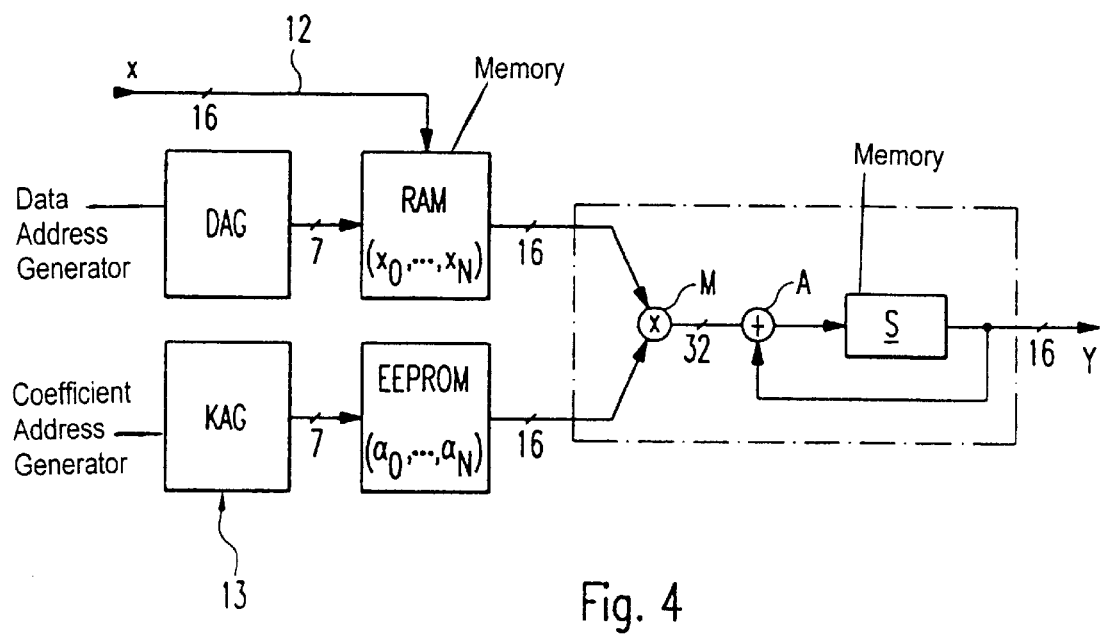
FIG. 4 shows a block diagram of a serial FIR filter with a programmable read-only memory.

FIG. 4 shows a second variant for implementation of the digital filter 3.2.1. The filter shown in FIG. 4 is a serial FIR filter, which is fully integrated onto a chip. The filter includes a read/write memory (RAM), into which N+1 values $x_0, \ldots, x_N$ of the digital receive signal 12 are read. Furthermore, the filter contains a programmable read-only memory (EEPROM), in which the filter coefficient sets $(\alpha_0, \ldots, \alpha_N)$ of the system standard S1, S2 concerned are stored. The data input values $x_0, \ldots, x_N$ and the filter coefficients $\alpha_0, \ldots, \alpha_N$ of a filter coefficient set, that have been pre-selected via the bandwidth-setting signal 13, are successively retrieved from a data address generator DAG or a coefficient address generator KAG, are multiplied in a single multiplier M and are recursively added by a single adder A with a downstream memory S. The multiplier M, the adder A and the memory S are implemented in the filter chip in hard-wired form. The serial FIR filter shown in FIG. 4 offers the advantage of simple hardware design, since, in contrast to the parallel FIR filter shown in FIG. 3, only one multiplier M and only one adder A are required.

According to a third variant, the filter 3.2.1 used according to the invention is designed as a programmable signal processor. In this case, the calculation rule defined in FIG. 4 by the interconnection of the multiplier M, the adder A and the memory S is implemented through the execution of a filter program, i.e. in software form. By re-programming a signal processor of this type, not only can the filter coefficients be exchanged and the order N of the filter be modified, but the filter type can also be modified (for example, parallel, serial, FIR or IIR) in a system-standard-dependent manner. For this purpose, filter programs FP1, FP2 can be stored in a memory area of the control unit 5 for each system standard S1, S2, and, when a system standard S1, S2 is selected, the corresponding filter program can be loaded into the filter 3.2.1 via a data link similar to the bandwidth-setting signal 13.

Depending on the design of the digital filter 3.2.1, values for N between 5 and 20, in particular between 10 and 18, are appropriate.

Figure 5:
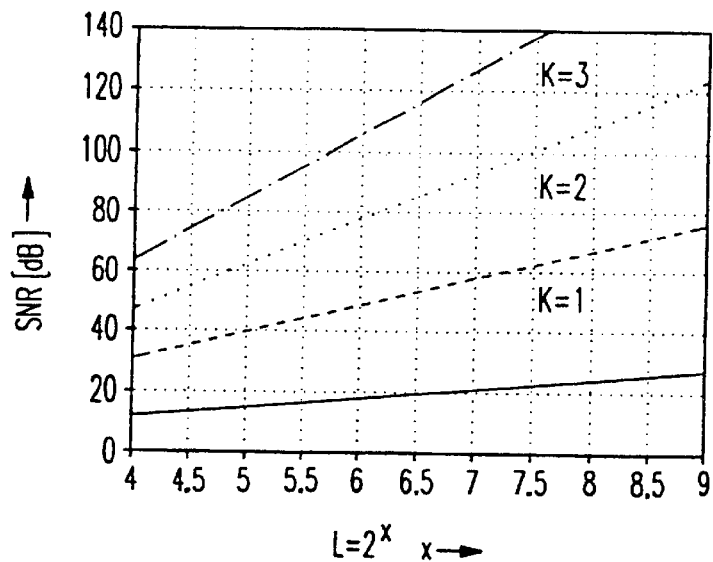
FIG. 5 shows a diagram representing the signal-to-noise ratio (SNR) of a conventional A/D converter and a ΔΣ A/D converter as a function of the up-sampling.

FIG. 5 illustrates the noise response of a conventional A/D converter (continuous line) and of ΔΣ A/D converters 3.1 of the orders K, K=1, 2, and 3 as a function of the up-sampling factor L (L=$2^x$), which is determined according to the equation $f_A=L\times2B'$ by the input-side sampling rate $f_A$ and the bandwidth B' of the low-pass filter 10. It is evident that the signal-to-noise ratio (SNR) can be improved by increasing the input-side sampling rate $f_A$ and by selecting a ΔΣ A/D converter 3.1 of a higher order K.

In a manner not shown, it can be provided that the input-side sampling rate $f_A$ is set by the control unit 5 in a system-standard-dependent manner.

Figure 6:
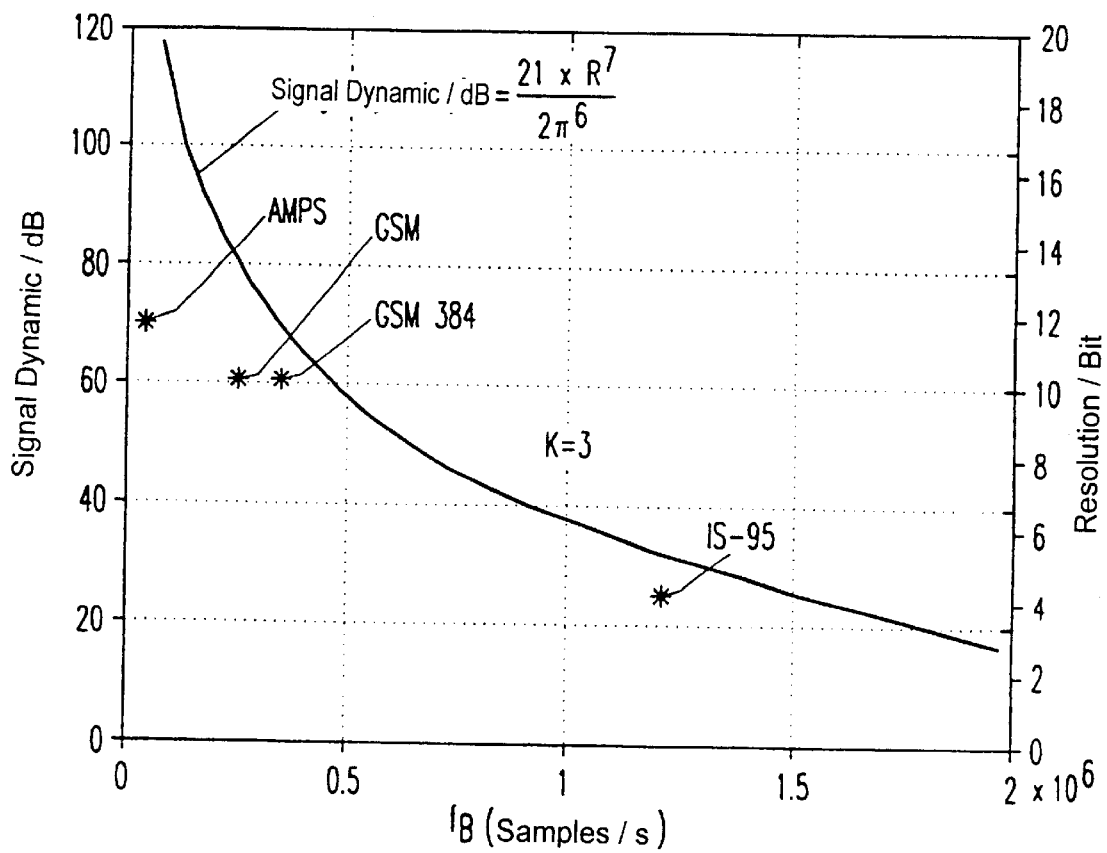
FIG. 6 shows a diagram representing the signal dynamic range at the output of the selection unit according to the sampling rate at the output of the selection unit.

FIG. 6 shows the signal dynamic range (in dB) at the output of the selection unit 3.2 as a function of the output-side sampling rate $f_B$. Furthermore, the resolution per bit of the output signal 15 is indicated in the right-hand part of the figure. The illustration is based on a fixed input-side sampling rate $f_A=6.5$ MHz and a ΔΣ A/D converter 3.1 that is of third-order (K=3). It is clear that the signal dynamic range which can be achieved at the output of the selection unit 3.2 is dependent on the sampling rate $f_B$ at the output of this selection unit 3.2.

The signal dynamic range values required for the mobile radio standards AMPS, GSM, GSM 384 and IS-95 (and the corresponding values of the resolution per bit) are recorded in FIG. 6. System standards with a high output-side sampling rate $f_B$ frequently require a smaller signal dynamic range at the output of the selection unit 3.2 than system standards with a low sampling rate $f_b$ at the output of the selection unit 3.2. For example, IS-95 requires a sampling rate of $1.23\times10^6$ samples/s and a signal dynamic range of 24 dB, whereas GSM, with a sampling rate of $2.71\times10^5$ samples/s, requires a signal dynamic range of 60 dB. The sampling rate reduction factor R is defined as $R=f_A/f_B$. The signal dynamic range is linked to the sampling rate reduction factor R by the following relationship:

$$\text{signal dynamic range}/dB = 21\times R^7/2\pi^6$$

FIG. 6 shows that all the mobile radio standards AMPS, GSM, GSM 384 and IS-95 indicated here as examples can be served with the combination of the third-order ΔΣ A/D converter 3.1 and the selection unit 3.2.

We claim:

1. A circuit configuration for a multistandard communications terminal, the configuration comprising:
    a radio frequency component for receiving RF input signals of different system standards, said radio frequency component including a receiver conversion stage for converting an RF receive signal into an analog receive signal through downconversion using a predefined conversion frequency, the RF receive signal being formed from at least one of the received RF input signals; and
    a signal-processing circuit including an A/D converter for converting the analog receive signal into a digital receive signal;
    said signal-processing circuit including a selection unit having a digital filter that receives the digital receive signal and outputs a bandwidth-limited digital output signal;
    said digital filter having a variably adjustable pass-band;
    the pass-band being set according to a required one of the different system standards; and
    said digital filter including a programmable read-only memory storing a table that allocates a set of filter coefficients to each one of the different system standards.

2. The circuit configuration according to claim 1, wherein:
    said selection unit includes a sampling rate reduction circuit having a variable sampling rate reduction; and
    the sampling rate reduction set in operation is determined according to the required one of the different system standards.

3. The circuit configuration according to claim 2, wherein said digital filter is an integrated circuit with a coefficient input for setting filter coefficients.

4. The circuit configuration according to claim 1, wherein said digital filter is an integrated circuit with a coefficient input for setting filter coefficients.

5. The circuit configuration according to claim 1, wherein said digital filter is a programmable signal processor.

6. The circuit configuration according to claim 5, wherein:
    a filter program for controlling said signal processor is allocated to each one of the different system standards; and
    said signal processor operates according to the allocated filter program when a specific one of the different system standards is selected.

7. The circuit configuration according to claim 1, wherein said digital filter includes a filter selected from the group consisting of an FIR filter, an IIR filter, and a combination including an FIR filter and an IIR filter.

8. The circuit configuration according to claim 1, wherein:
    said selection unit includes a sampling rate reduction circuit having a variable sampling rate reduction; and
    the sampling rate reduction set in operation is determined according to the required one of the different system standards;
    said digital filter includes a plurality of individual filters;
    said sampling rate reduction circuit includes a plurality of individual sampling rate reduction circuits; and
    said plurality of said individual filters and said plurality of said individual sampling rate reduction circuits are disposed alternately in series.

9. The circuit configuration according to claim 1, wherein said digital filter has an order between 5 and 20.

10. The circuit configuration according to claim 1, wherein said digital filter has an order between 10 and 18.

11. The circuit configuration according to claim 1, wherein said A/D converter is a third-order delta-sigma A/D converter.

12. The circuit configuration according to claim 11, wherein said delta-sigma A/D converter is operated at a sampling rate according to the selected one of the different system standards.

* * * * *